United States Patent
Leonard

(10) Patent No.: US 9,259,985 B2
(45) Date of Patent: Feb. 16, 2016

(54) GAS SPRING AND DAMPER ASSEMBLIES AND METHODS

(71) Applicant: Firestone Industrial Products Company, LLC, Indianapolis, IN (US)

(72) Inventor: Joshua R. Leonard, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/021,606

(22) Filed: Sep. 9, 2013

(65) Prior Publication Data

US 2014/0070468 A1 Mar. 13, 2014

Related U.S. Application Data

(60) Provisional application No. 61/698,498, filed on Sep. 7, 2012.

(51) Int. Cl.
*B60G 11/27* (2006.01)
*B60G 15/12* (2006.01)
*F16F 9/04* (2006.01)

(52) U.S. Cl.
CPC ............... *B60G 11/27* (2013.01); *B60G 15/12* (2013.01); *F16F 9/049* (2013.01); *F16F 9/0409* (2013.01); *F16F 9/0472* (2013.01); *B60G 2202/152* (2013.01); *B60G 2206/42* (2013.01); *Y10T 29/49611* (2015.01)

(58) Field of Classification Search
CPC ......... F16F 9/088; F16F 9/096; F16F 9/0472; F16F 9/0454; F16F 9/05; F16F 9/049; F16F 15/022; F16F 2224/043; F16F 2224/045; F16F 2230/18; B60G 15/12; B60G 11/27; B60G 2206/424; B60G 2202/152; B60G 2204/126; B60G 15/00; B60G 15/06; B60G 2202/15; B60G 2202/242; B60G 2202/314; B60G 13/00; B60G 13/14; Y10T 29/49609
USPC ............... 267/64.27, 64.28, 64.23, 64.19, 35, 267/118, 122
See application file for complete search history.

(56) References Cited

U.S. PATENT DOCUMENTS

| | | | | |
|---|---|---|---|---|
| 1,729,565 A | * | 9/1929 | Caretta | F16F 9/0472 267/35 |
| 1,878,756 A | | 9/1932 | Caldwell | |
| 1,884,477 A | * | 10/1932 | Wood | F16F 9/0472 267/35 |
| 2,056,106 A | * | 9/1936 | Kuhn | F16F 9/0445 267/35 |
| 2,773,686 A | * | 12/1956 | Nash | F16F 9/049 105/198.1 |
| 2,930,607 A | * | 3/1960 | Hutzenlaub | F16F 9/0472 267/35 |

(Continued)

FOREIGN PATENT DOCUMENTS

| | | |
|---|---|---|
| EP | 345210 | * 12/1989 |
| WO | WO 2012/054520 A1 | 4/2012 |

*Primary Examiner* — Anna Momper
*Assistant Examiner* — San Aung
(74) *Attorney, Agent, or Firm* — Jason A. Houser; Fay Sharpe LLP

(57) ABSTRACT

A gas spring and damper assembly can include a first gas spring having a first spring rate and a second gas spring connected in series with the first gas spring. The second gas spring can have a second spring rate that is at least two times the first spring rate of the first gas spring. A damper can be operatively connected with at least one of the first and second gas springs. A suspension system including one or more of such gas spring and damper assemblies and a method of assembly are also included.

20 Claims, 7 Drawing Sheets

(56) References Cited

U.S. PATENT DOCUMENTS

| | | | | |
|---|---|---|---|---|
| 3,212,769 | A * | 10/1965 | Ishibashi | B60G 15/12 137/195 |
| 3,332,677 | A * | 7/1967 | Long, Jr. | B60G 17/0272 267/34 |
| 4,325,541 | A * | 4/1982 | Korosladanyi | B60G 11/27 267/220 |
| 4,712,776 | A | 12/1987 | Geno et al. | |
| 6,691,989 | B1 * | 2/2004 | Leonard | B60G 17/0521 267/118 |
| 6,752,250 | B2 * | 6/2004 | Tanner | B60G 13/14 188/267 |
| 7,644,943 | B2 | 1/2010 | Hayes et al. | |
| 2006/0006590 | A1 * | 1/2006 | Brookes | B60G 13/003 267/64.27 |
| 2010/0289197 | A1 * | 11/2010 | Leonard | B60G 11/27 267/113 |
| 2011/0115140 | A1 * | 5/2011 | Moulik | B60G 15/14 267/64.23 |

* cited by examiner

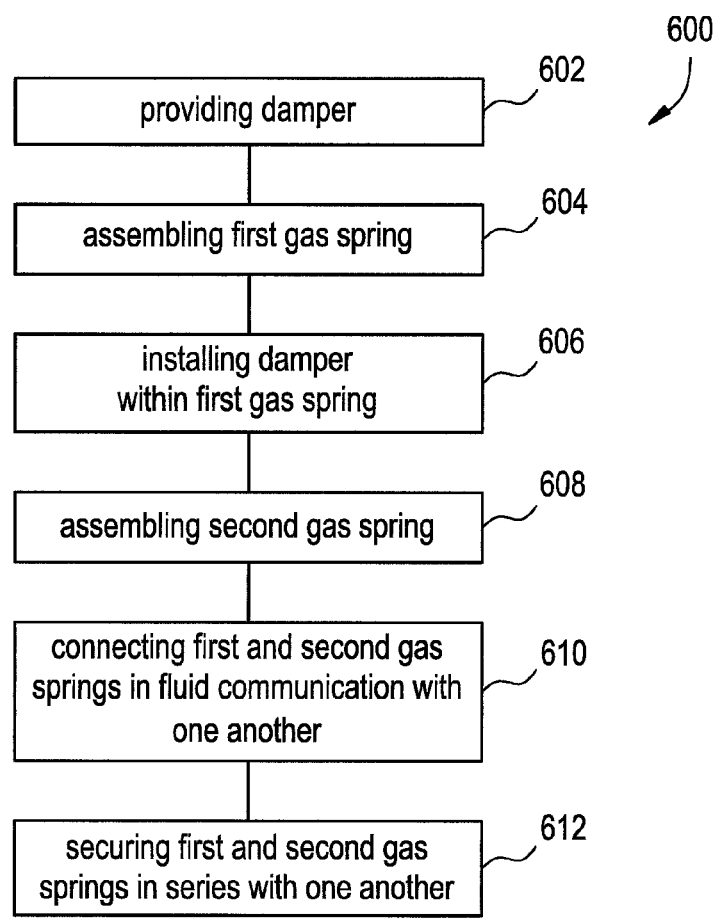

GAS SPRING AND DAMPER ASSEMBLIES AND METHODS

This application claims priority from U.S. Provisional Patent Application No. 61/698,498 filed on Sep. 7, 2012, which is hereby incorporated herein by reference in its entirety.

BACKGROUND

The subject matter of the present disclosure broadly relates to the art of gas spring devices and, more particularly, to gas spring and damper assemblies that include dual gas springs and an internal damper. Suspension systems including one or more of such gas spring and damper assemblies as well as methods of assembly are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring and damper assemblies of non-wheeled vehicles, support structures, height adjusting systems and actuators associated with industrial machinery, components thereof and/or other such equipment. Accordingly, the subject matter of the present disclosure is not intended to be limited to use associated with suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Generally, the plurality of spring elements function to accommodate forces and loads associated with the operation and use of the vehicle, and the plurality of damping devices are operative to dissipate undesired inputs and movements of the vehicle, particularly during dynamic operation thereof. Often, the spring elements are metal spring elements (e.g., coil springs, torsion springs) and the dampers are liquid-filled, hydraulic dampers that are secured between the sprung and unsprung masses of the vehicle separately from the spring elements. In other cases, however, gas spring and damper assemblies can be used, such as those that include a gas spring and a damper element that are operatively connected with one another. Examples of such known constructions are shown in U.S. Pat. Nos. 4,712,776 and 7,644,943, U.S. Patent Application Publication No. 2011/0115140, and International (PCT) Publication No. WO 2012/054520.

Notwithstanding the overall success of such known constructions, certain disadvantages may still exist that could be limiting to broader adoption and/or use of gas spring and damper assemblies. Non-limiting examples of properties and/or characteristics that may be desired over known constructions can include improved performance, reduced weight, simplified construction and/or decreased cost of manufacture. Accordingly, it is believed desirable to develop gas spring and damper assemblies that overcome the foregoing and/or other problem and/or disadvantages of known designs, or otherwise advance the art of gas spring devices.

BRIEF SUMMARY

One example of a gas spring and damper assembly in accordance with the subject matter of the present disclosure can include a first end member and a second end member disposed in spaced relation to the first end member such that a longitudinal axis extending therebetween. An intermediate structure can be interposed between the first and second end members. A first flexible wall portion can be operatively connected between the first end member and the intermediate structure. The first flexible wall portion can extend peripherally about the axis and at least partially define a first gas spring having a first spring chamber and a first spring rate. A second flexible wall portion can be operatively connected between the second end member and the intermediate structure. The second flexible wall portion can extend peripherally about the axis and can at least partially define a second gas spring having a second spring chamber and a second spring rate that is at least two times greater than the first spring rate. A damper operative to dissipate kinetic energy acting on the assembly can be at least partially disposed within at least one of the first and second spring chambers. The damper can be operatively connected to the intermediate structure and at least one of the first and second end members.

Another example of a gas spring and damper assembly in accordance with the subject matter of the present disclosure can include a first gas spring having a first spring rate and including a first end member, a second end member and a first flexible wall secured between the first and second end members such that a first spring chamber is at least partially define there between. A second gas spring can be connected in series with the first gas spring. The second gas spring can have a spring rate that is at least two times greater than the first spring rate. The second gas spring can include a third end member, a fourth end member and a second flexible wall secured between the third and fourth end members such that a second spring chamber is at least partially defined there between. A damper operative to dissipate kinetic energy acting on the assembly can be at least partially disposed within at least one of the first and second spring chambers. The damper can be operatively connected to at least one of the first end member, the second end member, the third end member and the fourth end member.

One example of a suspension system in accordance with the subject matter of the present disclosure can include can include a pressurized gas system including a pressurized gas source and a control device in fluid communication with the pressurized gas source. At least one gas spring and damper assembly in accordance with either one of the foregoing two paragraphs can be disposed in fluid communication with the pressurized gas source through the control device.

One example of a method of assembling a gas spring and damper assembly in accordance with the subject matter of the present disclosure can include providing a first end member, a second end member and an intermediate structure. The method can also include positioning the first end member and the second end member in spaced relation to one another with the intermediate structure interposed between the first and second end members. The method can further include securing a first flexible wall portion between the first end member and the intermediate structure to at least partially define a first gas spring having a first spring chamber and a first spring rate.

The method can also include securing a second flexible wall portion between the second end member and the intermediate structure to at least partially define a second gas spring having a second spring chamber and a second spring rate. The method can further include providing a damper operative to dissipate kinetic energy acting on the assembly and positioning at least a portion of the damper within at least one of the first and second spring chambers. The method can also include connecting the damper to the intermediate structure and at least one of the first and second end members.

BRIEF DESCRIPTION OF THE DRAWINGS

FIG. 7 is a graphical representation of one example of a method of assembly in accordance with the subject matter of the present disclosure.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
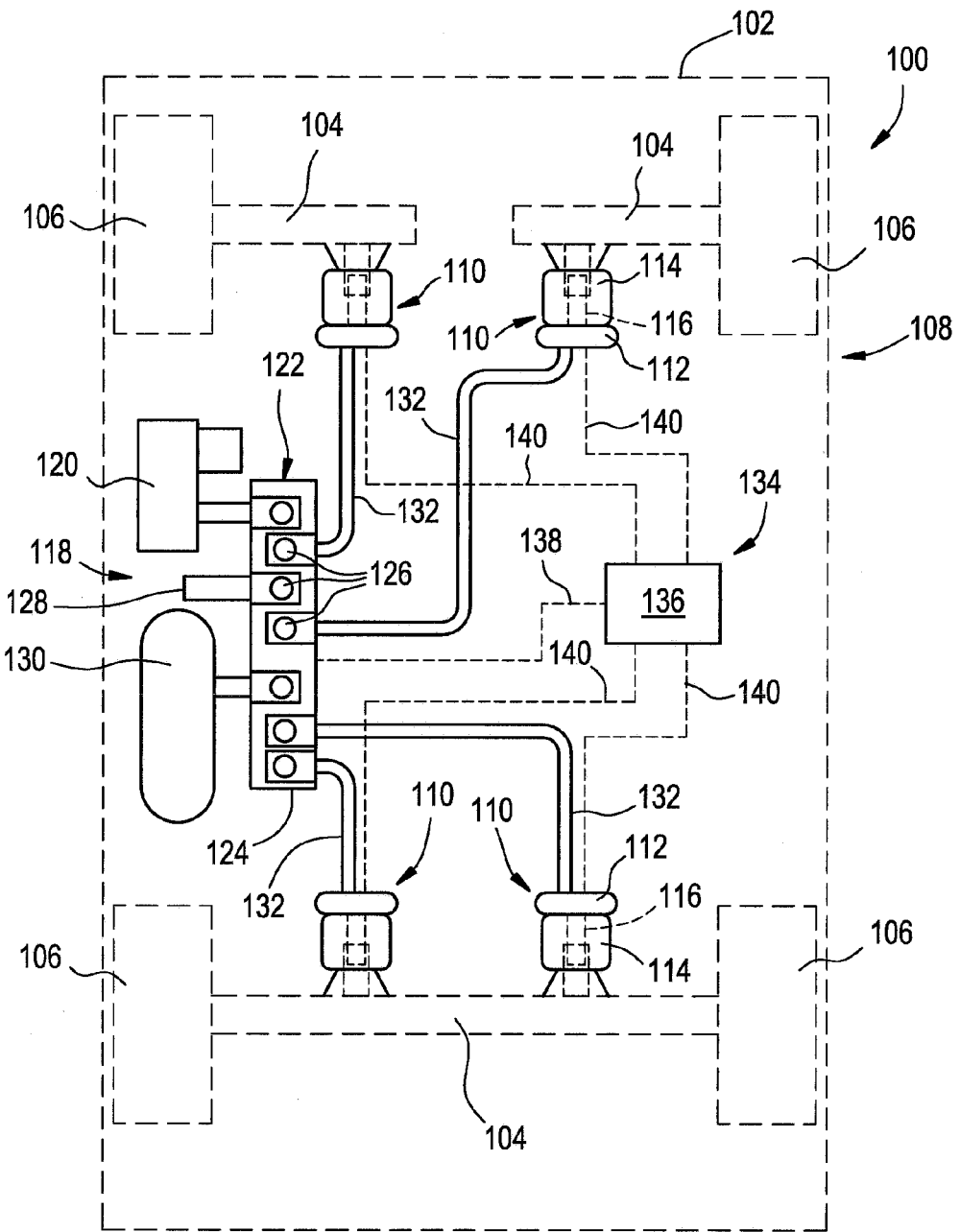
FIG. 1 is a schematic representation of one example of a suspension system of an associated vehicle that includes one or more gas spring and damper assemblies in accordance with the subject matter of the present disclosure.

FIG. 1 illustrates a vehicle 100 having a sprung mass, such as a vehicle body 102, for example, and an unsprung mass, such as axles 104 and/or wheels 106, for example. Additionally, vehicle 100 can include a suspension system 108 that is operatively connected between the sprung and unsprung masses. The suspension system can include a plurality of gas spring and damper assemblies 110 that are operatively connected between the sprung and unsprung masses of the vehicle. Assemblies 110 are shown as including gas springs 112 and 114, which are connected in series with one another, and at least one damper 116 that is at least partially operatively disposed within at least one of the gas springs.

Assemblies 110 can be disposed between the sprung and unsprung masses in any suitable manner, configuration and/or arrangement. For example, assemblies 110 are shown in FIG. 1 as being disposed adjacent wheels 106. Depending on desired performance characteristics and/or other factors, the suspension system may, in some cases, also include damping members (not shown) of a typical construction that are provided separately from assemblies 110 and secured between the sprung and unsprung masses in a conventional manner. In a preferred arrangement, however, gas spring and damper assemblies 110 will be sized, configured and operative to provide the desired performance characteristics for the suspension system without the use of additional damping members (e.g., conventional struts or shock absorbers) that are separately provided.

Suspension system 108 can also include a pressurized gas system 118 that is operatively associated with gas spring and damper assemblies 110 for selectively supplying pressurized gas (e.g., air) thereto and selectively transferring pressurized gas therefrom. In the exemplary embodiment shown in FIG. 1, pressurized gas system 118 includes a pressurized gas source, such as a compressor 120, for example, for generating pressurized air or other gases. A control device, such as a valve assembly 122, for example, is shown as being in communication with compressor 120 and can be of any suitable configuration or arrangement. In the exemplary embodiment shown, valve assembly 122 includes a valve block 124 with a plurality of valves 126 supported thereon. Valve assembly 122 can also, optionally, include a suitable exhaust, such as a muffler 128, for example, for venting pressurized gas from the system. Optionally, pressurized gas system 118 can also include a reservoir 130 in fluid communication with compressor 120 and/or valve assembly 122 and suitable for storing pressurized gas.

Valve assembly 122 is in communication with gas spring and damper assemblies 110 through suitable gas transfer lines 132. As such, pressurized gas can be selectively distributed or otherwise transferred into and/or out of the gas spring and damper assemblies through valve assembly 122 by selectively operating valves 126, such as to alter or maintain vehicle height at one or more corners of the vehicle, for example.

It will be appreciated that gas spring and damper assemblies 110 can take any suitable form, configuration and/or construction in accordance with the subject matter of the present disclosure. In the arrangement shown in FIG. 1, gas spring and damper assemblies 110 include gas springs 112 and 114 that are both structurally and fluidically connected in series with one another. Additionally, damper 116 is shown as being substantially-entirely contained within gas spring 114. It will be appreciated, however, that other configurations and/or arrangements could alternately be used. For example, damper 116 could be substantially-entirely housed within gas spring 112, or, alternatively, could be at least partially housed within both gas spring 112 and gas spring 114.

Gas springs 112 and 114 can be of any suitable type, kind and/or construction (e.g., rolling lobe-type springs and/or convoluted bellows-type springs) in any combination, and can each include a spring chamber (not numbered) that is operative to receive and retain a quantity of pressurized gas. In some cases, the spring chambers can be in fluid communication with one another such that pressurized gas can flow therebetween. Additionally, damper 116 can be of any suitable type, kind and/or construction (e.g., a hydraulic damper, a pressurized gas damper, an electromagnetic damper and/or an electrorheologic damper). In some cases, damper 116 may include a plurality of components that are telescopically interconnected with one another and at least partially define a damping chamber. In a preferred arrangement, the damper can be at least partially received within the spring chamber of at least one of the gas springs. In some cases, the damper may be an otherwise conventional hydraulic damper. In other cases, the damper may be a gas damper that utilizes pressurized gas in one or more damping chambers, which may, in some cases, be in fluid communication with the spring chambers of one or more of the gas springs.

In operation of the exemplary arrangement shown in FIG. 1, valve assembly 122 can be selectively actuated to transfer pressurized gas from the compressor and/or reservoir to one or more of gas spring and damper assemblies 110 via one or more of gas transfer lines 132. Additionally, valve assembly 122 can be selectively actuated to exhaust pressurized gas from one or more of the gas spring and damper assemblies through the gas transfer lines, such as by way of muffler 128 or another suitable arrangement. It will be appreciated that the foregoing pressurized gas system and operation thereof are merely exemplary and that other suitable pressurized gas sources, systems and/or methods of operation could alternately be used without departing from the subject matter of the present disclosure.

Suspension system 108 also includes a control system 134 for selectively operating, adjusting or otherwise influencing or controlling the performance or one or more suspension system components, such as gas spring and damper assemblies 110 and/or pressurized gas system 118, for example. Control system 134 can include an electronic control unit (ECU) 136 in communication with one or more components of pressurized gas system 118, such as compressor 120 and/or valve assembly 122, for example, such as by way of a communication line 138, for example, for selective actuation and/or operation thereof.

Electronic control unit 136 is also shown in FIG. 1 as being in communication with suitable height sensing devices (not shown in FIG. 1) that can, optionally, be used in association with gas spring and damper assemblies 110. It will be appreciated that such communications can be implemented in any suitable manner, such as by way of communication lines 140, for example. Additionally, it will be appreciated that height sensors or other distance-determining devices of any suitable type, kind, construction and/or configuration can be used, such as mechanical linkage sensors, ultrasonic wave sensors or electromagnetic wave sensors, for example. Additionally, other sensors, sensing devices and/or other such components can also, optionally, be used in connection with control system 134, such as pressure sensors, accelerometers and/or temperature sensors, for example.

As indicated above, it will be appreciated that a gas spring and damper assembly in accordance with the subject matter of the present disclosure can be of any suitable type, kind, configuration and/or arrangement, and can include any suitable combination of components. Broadly, a gas spring and damper in accordance with the subject matter of the present disclosure can include a first gas spring that has a first spring rate and a second gas spring that has a second spring rate that is greater than the first spring rate of the first gas spring. In some cases, the first gas spring can be formed separately from the second gas spring. In such case, the first and second gas springs can be assembled together to at least partially form a gas spring and damper assembly in accordance with the subject matter of the present disclosure. In other cases, the first gas spring can be formed from a plurality of components and the second gas spring can be formed from one or more of the components of the first gas spring together with one or more additional components. In such case, the first and second gas springs will be formed from one or more common components, such as a common end member and/or a common flexible wall, for example.

As indicated above, it is desirable for the first gas spring to have a first spring rate and the second gas spring to have a second spring rate that is different than the first spring rate. It will be appreciated that any suitable difference in the magnitude of the spring rates can be used, such as a differential ratio (higher spring rate/lower spring rate) within a range of from approximately 1.25 times to approximately 10 times. As one example, the spring rate of one gas spring can be at least twice the spring rate of the other gas spring. In a preferred arrangement, the spring rate of the stiffer gas spring will be at least four times the spring rate of the more compliant gas spring.

It will be appreciated that the variation between the first spring rate and the second spring rate can be achieved in any suitable manner and/or through the use of any suitable combination of features and/or components. As one example, the first gas spring could be of one type or kind (e.g., a rolling lobe-type spring) and the second gas spring could be of a different type or kind (e.g., a convoluted bellows-type spring). As another example, the first and second gas springs could be formed from similar components that form first and second gas springs of a common type or kind. However, one or more of the components of each of the first and second gas springs can be of a different size, shape and/or configuration. In such case, the first and second gas springs can have different spring volumes and corresponding spring rates that differ from one another. As a further example, the first and second gas springs could be formed from substantially identical components such that the first and second gas springs have substantially identical spring volumes, as established by the gas spring components. In such case, however, a quantity of material (e.g., an expandable foam, a granular material, a jounce bumper or other additional component) could be mounted within the spring chamber of the second spring to reduce the spring volume and thereby increase the spring rate of the second gas spring.

As discussed above, it will be appreciated that a gas spring and damper assembly in accordance with the subject matter of the present disclosure will, during use, be subjected to varying forces, load conditions and/or other inputs. As such, a gas spring and damper assembly will be displaced between compressed and extended conditions, such as may correspond to jounce and rebound conditions of a vehicle suspension system, for example. Due, at least in part, to the variation in spring rates, it will be recognized and understood that such variations in forces, load conditions and/other inputs will generally result in greater displacement of the gas spring having the lower spring rate relative to the displacement of the gas spring having the higher spring rate. As such, a gas spring and damper assembly in accordance with the subject matter of the present disclosure can, optionally, include one or more passages or openings extending between the spring chambers of the first and second gas springs such that the spring chambers are in fluid communication with one another. In such cases, pressurized gas transfer will be generated between the spring chambers of the first and second gas springs. In some cases, the one or more passages or openings can be sized, shaped and/or otherwise configured to generate pressurized gas damping from the flow of pressurized gas into, out of and between the first and second spring chambers of the first and second gas springs. In some cases, the one or more passages or openings can be sized, shaped and/or otherwise configured to generate pressurized gas damping over a predetermined range of frequencies, such as damping within a range of from approximately 1 Hz to approximately 4 Hz, for example.

Additionally, a gas spring and damper assembly in accordance with the subject matter of the present disclosure can include a damper that is operatively disposed within at least one of the first and second gas springs. In a preferred arrangement, the damper can be operatively associated with at least the gas spring having the lower spring rate. As indicated above, the gas spring having the lower spring rate will typically undergo displacement over greater distances than the gas spring having the higher spring rate. As such, in such a preferred arrangement, the damper is at least partially disposed within the gas spring having the lower spring rate and is operatively connected between the end members thereof. In this manner, inputs acting on the gas spring and damper assembly can be reacted to the damper through the displacement of the gas spring having the lower spring rate.

As indicated above, it will be appreciated that a damper of any suitable type, kind, configuration and/or construction can be used. In some cases, a conventional hydraulic damper (e.g., a shock absorber or strut) could be used. In other cases, a damper that utilizes pressurized gas as the working medium could be used. In such cases, the pressurized gas can, in some cases, be in fluid communication with one or more of the first and/or second spring chambers of the first and/or second gas springs. In some cases, the damper can be sized, shaped and/or otherwise configured to generate damping over a predetermined range of frequencies, such as damping within a range of from approximately 8 Hz to approximately 14 Hz, for example. In a preferred arrangement, the damping associated with the pressurized gas flow between the gas springs and the damping generated by the damper can be targeted toward two different predetermined frequency ranges.

It will be recognized and appreciated that a gas spring and damper assembly in accordance with the subject matter of the present disclosure will be secured between opposing structural components such that one end member of one gas spring and the opposing end member of the other gas spring are operatively connected to the opposing structural components. In such cases, the one or more remaining end members can form an intermediate structure of the gas spring and damper assembly. In some cases, the damper can be secured between the outermost end member and the intermediate structure of one of the gas springs. As a result, one end of the gas damper can be secured in fixed relation to one of the outermost end member and the intermediate structure with the other end of the damper secured in pivotal or otherwise displaceable relation to the other of the outermost end member and the intermediate structure. That is, one end of the damper can be fixedly attached to either the outermost end member or the intermediate structure. And, the other end of the damper can be pivotally attached to the other one of the outermost end member and the intermediate structure. In such cases, the weight, cost and/or complexity of including articulating mounts on both ends of the damper may be avoided.

Figure 2:
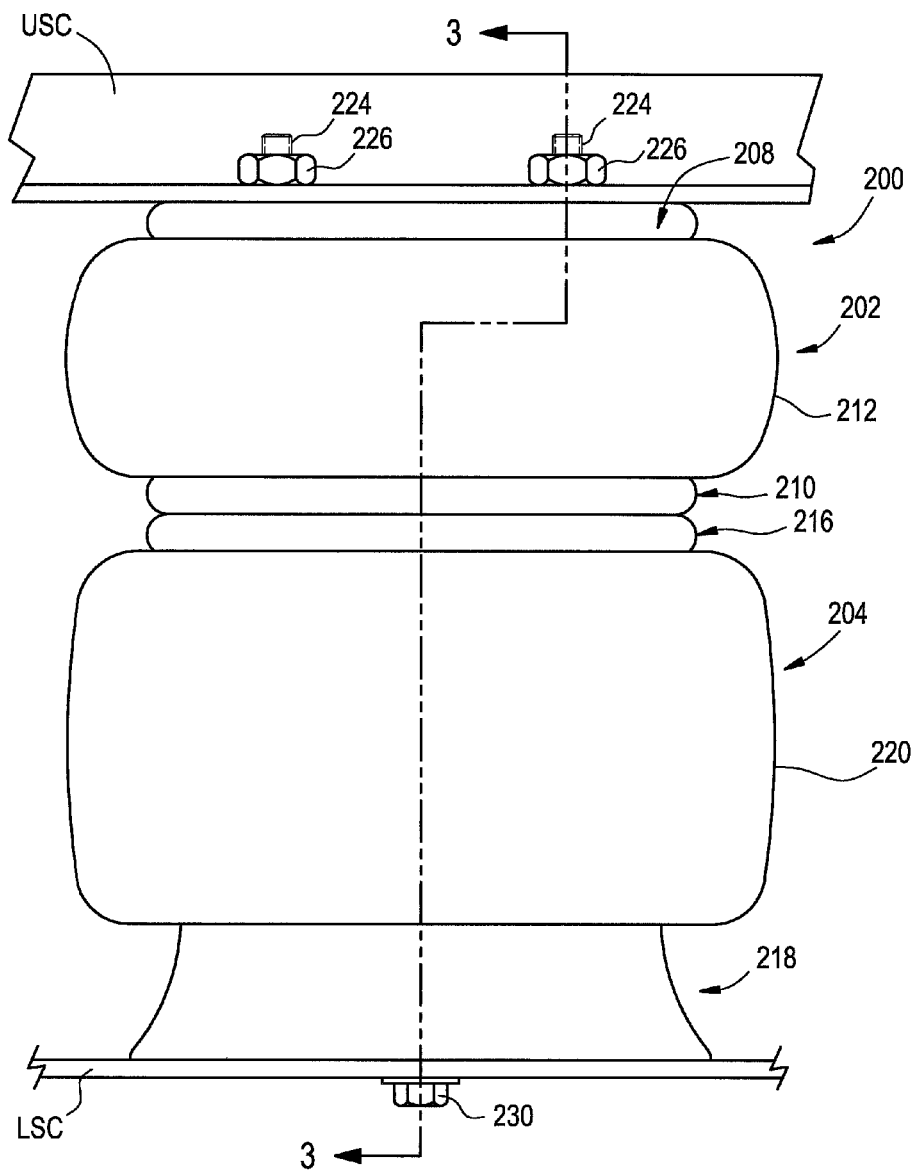
FIG. 2 is a side view of one example of a gas spring and damper assembly in accordance with the subject matter of the present disclosure.
Figure 3:
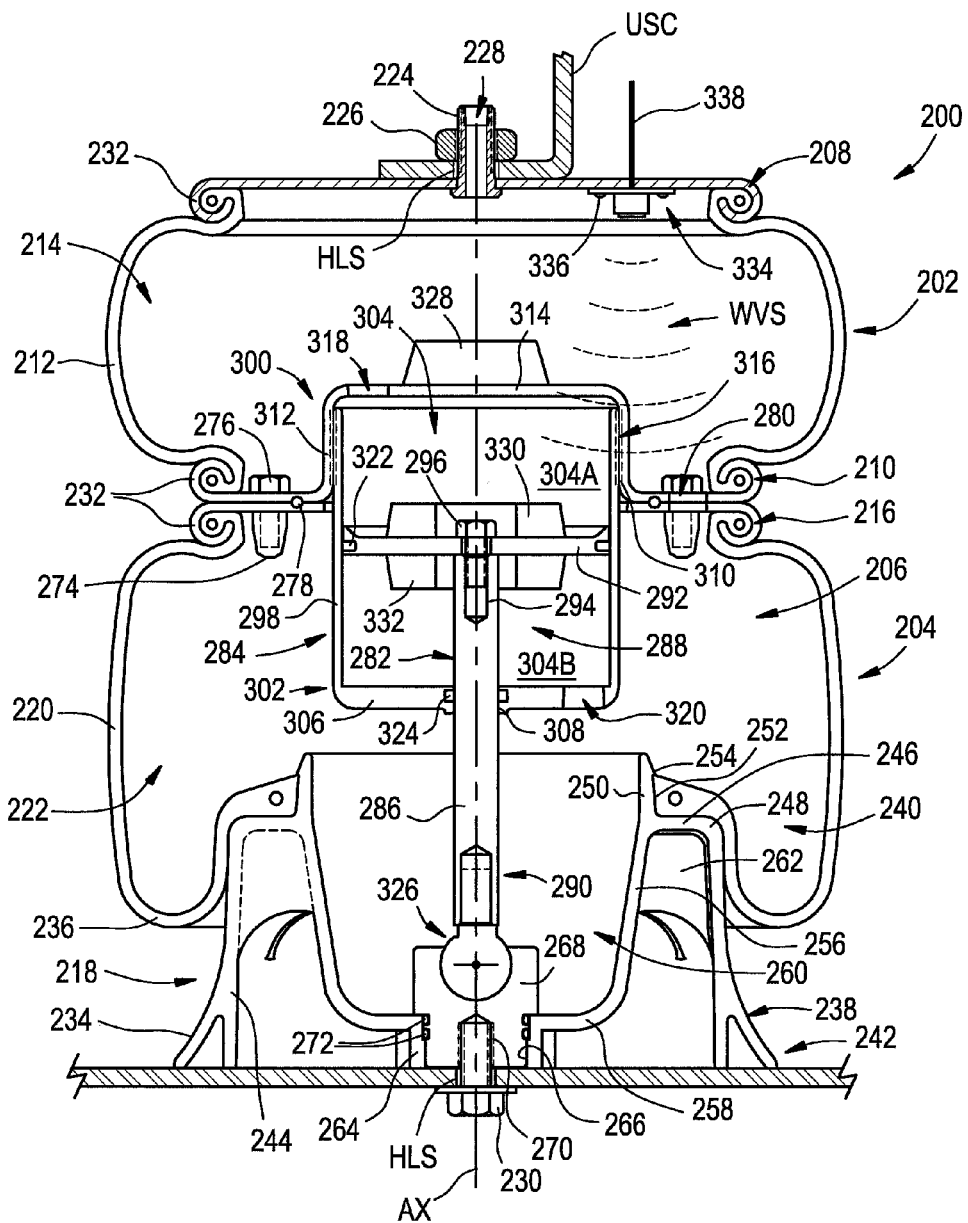
FIG. 3 is a cross-sectional side view of the gas spring and damper assembly in FIG. 2 taken from along line 3-3 therein.

One example of a gas spring and damper assembly 200 in accordance with the subject matter of the present disclosure, such as has been described above and/or may be suitable for use as gas spring and damper assemblies 110 in FIG. 1, is shown in FIGS. 2 and 3 as having a longitudinally-extending axis AX (FIG. 3). Assembly 200 includes a gas spring 202, a gas spring 204 and a damper 206 that is substantially-entirely disposed within gas spring 204. In the arrangement shown in FIGS. 2 and 3, gas spring 202 is of a convoluted bellows-type construction and gas spring 204 is of a rolling lobe-type construction. As such, gas spring 202 includes end members 208 and 210 with a bellows-type flexible wall 212 secured therebetween. In a preferred arrangement, substantially fluid-tight seals are formed between flexible wall 212 and end members 208 and 210 such that a spring chamber 214 is at least partially defined therebetween. Similarly, gas spring 204 includes end members 216 and 218 with a rolling lobe-type flexible wall 220 secured therebetween. Again, in a preferred arrangement, substantially fluid-tight seals are formed between flexible wall 220 and end members 216 and 218 such that a spring chamber 222 is at least partially defined therebetween.

Gas spring and damper assembly 200 can be disposed between associated sprung and unsprung masses of an associated vehicle in any suitable manner. For example, one end member of one gas spring can be operatively connected to the associated sprung mass with one end member of the other gas spring disposed toward and operatively connected to the associated unsprung mass. In the embodiment shown in FIGS. 2 and 3, for example, end member 208 is secured along a first or upper structural component USC, such as associated vehicle body BDY in FIG. 1, for example, and can be secured thereon in any suitable manner. For example, one or more securement devices, such as mounting studs 224, for example, can be included along end member 208. In some cases, the one or more securement devices (e.g., mounting studs 224) can project outwardly from end member 208 and can be secured thereon in a suitable manner, such as, for example, by way of a flowed-material joint (not shown) or a press-fit connection (not identified). Additionally, such one or more securement devices can extend through mounting holes HLS in upper structural component USC and receive one or more threaded nuts 226 or other securement devices, for example. As an alternative to one or more of mounting studs 224, one or more threaded passages (e.g., blind passages and/or through passages) could be used in conjunction with a corresponding number of one or more threaded fasteners.

Additionally, a fluid communication port, such as a transfer passage 228 (FIG. 3), for example, can optionally be provided to permit fluid communication with one or more of spring chambers 214 and/or 222, such as may be used for transferring pressurized gas into and/or out of one or more of the spring chambers, for example. In the exemplary embodiment shown, transfer passage 228 extends through at least one of mounting studs 224 and is in fluid communication with spring chamber 214. It will be appreciated, however, that any other suitable fluid communication arrangement could alternately be used.

End member 218 can be secured along a second or lower structural component LSC, such as an axle AXL in FIG. 1, for example, in any suitable manner. As one example, lower structural component LSC could include one or more mounting holes HLS extending therethrough. In such case, a threaded fastener 230 could extend through one of mounting holes HLS and threadably engage end member 218 or a component thereof to secure the end member on or along the lower structural component.

It will be appreciated that the one or more end members can be of any suitable type, kind, construction and/or configuration, and can be operatively connected or otherwise secured to one or more flexible walls in any suitable manner. In the exemplary arrangement shown in FIGS. 2 and 3, for example, end members 208, 210 and 216 are of a type commonly referred to as a bead plate and are secured to corresponding ends of a flexible wall using a crimped-edge connection 232. End member 218 is shown in the exemplary arrangement in FIGS. 2 and 3 as being of a type commonly referred to as a piston (or a roll-off piston) that has an outer surface 234 that abuttingly engages flexible wall 220 such that a rolling lobe 236 is formed therealong. As gas spring and damper assembly 200 is displaced between extended and collapsed conditions, rolling lobe 236 is displaced along outer surface 234 in a conventional manner.

As identified in FIG. 3, end member 218 can include an end member body 238 and can extend from along a first or upper end 240 toward a second or lower end 242 that is spaced longitudinally from end 240. Body 238 can include a longitudinally-extending outer side wall 244 that extends peripherally about axis AX and at least partially defines outer surface 234. An end wall 246 is disposed transverse to axis AX and extends radially-inwardly from along a shoulder portion 248, which is disposed along the outer side wall toward end 240. Body 238 also includes a first inner side wall 250 that extends longitudinally-outwardly beyond end wall 246 and peripherally about axis AX. First inner side wall 250 has an outer surface 252 that is dimensioned to receive an end of flexible wall 220 such that a substantially fluid-tight seal can be formed therebetween. A retaining ridge 254 can project radially-outward from along first inner side wall 250 and can extend peripherally along at least a portion thereof.

Body 238 can also include a second inner side wall 256 that extends longitudinally-inward into the body from along end wall 246. Second inner side wall 256 can terminate at a bottom wall 258 that is approximately planar and disposed transverse to axis AX such that second inner side wall 256 and bottom wall 258 at least partially define a cavity 260 within body 238. In some cases, bridge walls 262 can, optionally, extend between and operatively interconnect outer side wall 244 and second inner side wall 256.

An inner support wall 264 can be is disposed radially-inwardly from outer side wall 244 and can extend peripherally about axis AX. In some cases, inner support wall 264 can form a hollow column-like structure that projects from along bottom wall 258 in a longitudinal direction toward end 242. In some cases, the distal end of outer side wall 244 and/or the distal end of inner support wall 264 can at least partially define a mounting plane formed along end 242 of the end member body. In this manner, body 238 can be supported at least in part by outer side wall 244 and/or inner support wall 264, such as on or along an associated structural member (e.g., lower structural component LSC in FIGS. 2 and 3). In some cases, inner support wall 264 can include an inner surface 266 that at least partially defines a passage (not numbered) through end member 218. In such cases, a securement element 268 can be at least partially received within the passage, and can be operative to receivingly engage threaded fastener 230 or another securement device, such as within a threaded passage 270 formed therein, for example. In a preferred arrangement, one or more sealing elements 272, such as one or more O-rings, for example, can be sealingly disposed between securement element 268 and inner support wall 264 such that a substantially fluid-tight seal can be formed and maintained therebetween.

As indicated above, in some cases, the innermost end members of the two gas springs can be secured together in a suitable manner to form an intermediate structure of the gas spring and damper assembly. In the arrangement shown in FIGS. 2 and 3, end members 210 and 216 are disposed in abutting engagement with one another and are secured together by way of a plurality of threaded connections. As one example of such an arrangement, end member 216 can include a plurality of threaded connectors 274 that can be secured in a substantially fluid-tight manner on or along the end member. A plurality of holes or openings (not shown) can extend through end members 210 and 216 in approximate alignment with threaded connectors 274. A plurality of threaded fasteners 276 can extend through the holes or openings in the end members and threadably engage connectors 274 to secure end members 210 and 216 in abutting engagement with one another.

In some cases, it may be desirable to maintain a substantially fluid-tight seal between end members 210 and 216. It will be appreciated that such an arrangement can be formed in any suitable manner. As one example, a flowed-material joint could be formed between the end members. As another example, a sealing element 278 can be captured between end members 210 and 216 in a suitable manner, such as by being at least partially receive in one or more endless, annular grooves (not identified). Additionally, one or more openings can extend through end members 210 and 216 in approximate alignment with one another such that damping passage 280 can be formed through the intermediate structure to permit fluid communication and pressurized gas transfer between spring chambers 214 and 222.

As indicated above, gas springs 202 and 204 preferably have different spring rates such that one of the gas springs deflects at a different rate than the other gas spring. In the arrangement shown in FIGS. 2 and 3, gas spring 202 is a convoluted bellows-type gas spring that has a greater spring rate than gas spring 204, which is of a rolling lobe-type construction. In a preferred arrangement, gas springs 202 and 204 are sized and configured relative to one another such that the spring rate of gas spring 202 is at least approximately two times the spring rate of gas spring 204. In a more preferred arrangement, the spring rate of gas spring 202 can be within a range of from approximately four times to approximately 10 times the spring rate of gas spring 204.

In addition to the pressurized gas damping that may be generated as a result of the different spring rates of gas springs 202 and 204, gas spring and damper assembly 200 can also include damper 206, which can be secured in operative association with gas spring 202 and/or 204 in any suitable manner. Additionally, as indicated above, damper 206 can be of any suitable construction and/or configuration, and can provide damping using any suitable principles of operation. As one example, the damper could take the form of an otherwise conventional hydraulic damper.

As another example, damper 206 can take the form of a pressurized gas damper that utilizes pressurized gas as the operating medium and is shown in FIG. 3 as including damper elements 282 and 284 that are operatively interconnected with one another for telescopic extension and compression. Damper element 282 is shown as being operatively connected to end member 218, and extends from the end member toward end member 216. Damper element 284 is shown as being operatively connected to end member 216, and extends from the end member toward end member 218. Additionally, damper elements 282 and 284 are operatively interconnected with one another such that the damper elements can move relative to one another as gas spring and damper assembly 200 undergoes displacement between compressed and extended conditions.

As shown in FIG. 3, damper element 282 includes a damper rod 286 that extends longitudinally from an end 288 to an end 290. A damper piston 292 is disposed along end 288 of damper rod 286 and can be attached or otherwise connected thereto in any suitable manner. For example, the damper piston could be integrally formed with the damper rod. As another example, end 288 of damper rod 286 can include a securement feature, such as a threaded passage 294, for example. Damper piston 292 could include a hole (not numbered) extending therethrough such that a securement device, such as a threaded fastener 296, for example, could be used to secure damper piston 292 along end 288 of damper rod 286.

Damper element 284 includes a side wall 298 extending circumferentially about axis AX between longitudinally-spaced ends 300 and 302 such that a longitudinally-extending damping chamber 304 is at least partially formed by side wall 298. Damping chamber 304 can be can be at least partially formed or otherwise further defined by one or more additional walls or wall portions. For example, damper element 284 can include an end wall 306 that is secured across side wall 298 along end 302 such that damping chamber 304 of damper element 284 is open along end 300 and enclosed along end 302 of the damping element. End wall 306 can include a passage wall 308 that at least partially defines a rod passage (not numbered) extending through the end wall.

It will be appreciated that damper element 284 can be secured on or along the intermediate structure or a component thereof in any suitable manner. One example of a suitable construction is shown in FIG. 3 in which end member 216 includes an edge wall 310 that at least partially defines an opening or passage (not numbered) extending through end member 216. Additionally, end member 210 is shown as including a base wall portion (not numbered) through which passage 280 can extend, an attachment wall portion 312 that extends from along the base wall portion in an axial direction toward end member 208, and an end wall portion 314 that extends across attachment wall portion 312 in an orientation generally transverse to axis AX. Attachment portion 312 and end wall portion 314 can at least partially define an external recess or cavity (not numbered) extending inwardly into gas spring 202 from along end member 210.

In some cases, at least a portion of side wall 298 of damper element 284 can extend through the opening in end member 216 that is formed by edge wall 310 and extend into the external cavity in end member 210 of gas spring 202. Additionally, side wall 298 can be secured on or along attachment wall portion 312 of end member 210 in any suitable manner, such as by way of a threaded connection 316, for example. In this manner, damper element 284 can be fixedly attached to the intermediate structure of gas spring and damper assembly 200, and end wall portion 314 of end member 210 can at least partially form a closed end of damping chamber 304. As one example, threaded connection 316 could be formed by one or more helical threads (not identified) disposed along an outer peripheral surface of side wall 298 and a corresponding one or more helical threads (not identified) disposed along an inner peripheral surface of attachment wall portion 312. It will be appreciated, however, that other securement features and/or connection arrangements could alternately be used.

As discussed above, damper elements 282 and 284 are operatively interengaged with one another for telescopic extension and compression. In the exemplary arrangement shown, damper piston 292 is disposed within damping chamber 304 and damper rod 286 extends out of damping chamber 304 through the rod passage (not numbered) that is at least partially defined by passage wall 308. As such, end 290 of damper rod 286 is disposed outwardly of damping chamber 304 and can be operatively connected along end member 218 in a suitable manner.

Damping chamber 304 is separated by damper piston 292 into chamber portions 304A and 304B. In some cases, it may be desirable to maintain chamber portions 304A and 304B in fluidic isolation from one another, such as by including one or more sealing elements (not shown) operatively disposed between damper piston 292 and side wall 298. Additionally, it may be desirable to include one or more sealing elements (not shown) between damper rod 286 and passage wall 308, such that a substantially fluid-tight seal is formed therebetween and such that damping chamber 304 and spring chamber 222 are fluidically isolated from one another through the rod passage. In such case, one or more fluid communication ports can be selectively provided in one or more of damper piston 292, side wall 298, end wall 306 and/or end wall portion 314 of end member 210. In the arrangement shown in FIG. 3, for example, a communication port 318 can, optionally, extend through end wall portion 314 such that chamber portion 304A and spring chamber 214 are in fluid communication with one another. Additionally, a communication port 320 can, optionally, extend through end wall 306 such that chamber portion 304B and spring chamber 222 are in fluid communication with one another. It will be appreciated that such fluid communication ports, if provided, can be sized and configured to generate damping forces during relative movement between damper element 282 and damper element 284. In some cases, one or more valves and/or throttle elements could be included in fluid communication on or along the one or more fluid communication ports.

It will be recognized that significant frictional forces may be generated by the sealing arrangements described above in connection with the interface between damper piston 292 and side wall 298 as well as in connection with the interface between damper rod 286 and passage wall 308. In some cases, it may be desirable to avoid these frictional forces (or for other reasons) by forgoing the use of sealing elements along the interface between damper piston 292 and side wall 298 and/or along the interface between damper rod 286 and passage wall 308. In such case, a friction reducing bushing or wear band can, optionally, be disposed between the damper piston and the side wall and/or between the damper rod and the passage wall. As identified in FIG. 3, friction-reducing bushings or wear bands 322 and 324 are respectively disposed between damper piston 292 and side wall 298 and between damper rod 286 and passage wall 308.

It will be recognized that the foregoing discussion of FIGS. 2 and 3 regarding the displacement of gas spring and damper assembly 200 from a design height to a compressed height and an extended height included movement in a substantially longitudinal direction. In many applications, such as vehicle applications, for example, conventional gas spring assemblies are often displaced such that the outermost end members (e.g., end members 208 and 218) are disposed at an angle relative to one another. In some cases, the angle may change (e.g., increase or decrease) as the end members are displaced toward and away from one another.

For the subject matter of the present disclosure to be capable of broad use in a wide variety of applications, it is desirable for gas spring and damper assembly 200 to be capable of operation in applications and operating conditions that can result in relatively high misalignment conditions between the outermost end members without interfering with the operation and/or seal integrity of damper 206. As such, end 290 of damper element 282 can be operatively connected with end member 218 by way of a high-articulation misalignment mount 326 that is capable of freely compliant (e.g., non-resilient) articulation. In this manner, end 288 of damper element 284 can be fixedly attached to the intermediate structure of gas spring and damper assembly 200, such as has been described above, for example, which can, in turn, be displaced relative to the end member (e.g., end member 208) disposed opposite the end member (e.g., end member 210) to which the misalignment mount is secured.

Gas spring and damper assembly 200 can, optionally, include one or more additional features, devices and/or components. For example, assembly 200 can include one or more bumpers or cushions, such as may be used to inhibit direct contact between components of the gas spring and damper assembly, such as may otherwise occur at or near end-of-travel conditions (i.e., full jounce and/or full rebound conditions) of the gas spring and damper assembly. In the arrangement shown in FIG. 3, for example, gas spring and damper assembly 200 includes a bumper 328 disposed along end wall portion 314 of end member 210 in facing relation with end member 208 such that direct contact between end members 208 and 210 can be inhibited by bumper 328. Additionally, or in the alternative, a bumper 330 can be dispose on or along damper piston 292 in facing relation to end wall portion 314 such that direct contact between the damper piston and the end wall portion can be inhibited. Furthermore, or as a further alternative, a bumper 332 can be disposed on or along damper piston 292 in facing relation to end wall 306 such that direct contact between the damper piston and the end wall can be inhibited.

Gas spring and gas damper assembly 200 can also, optionally, include a height or distance sensing device of a suitable type, kind and/or configuration. In the arrangement shown in FIG. 3, a height or distance sensing device 334 is schematically represented as being disposed within spring chamber 214 along end member 208 and being secured thereto using suitable fasteners 336. Height sensing device 334 can be of any suitable type, kind and/or construction, such as an ultrasonic sensor that transmits and receives ultrasonic waves WVS, for example. Additionally, it will be appreciated that height sensing device 334 can be connected to other systems and/or components of a vehicle suspension system in any suitable manner. As shown in FIG. 3, for example, height sensing device 334 includes a lead or connection 338 that can be used for such communication purposes, such as is indicated by leads 140 of control system 134 in FIG. 1, for example.

Figure 4:
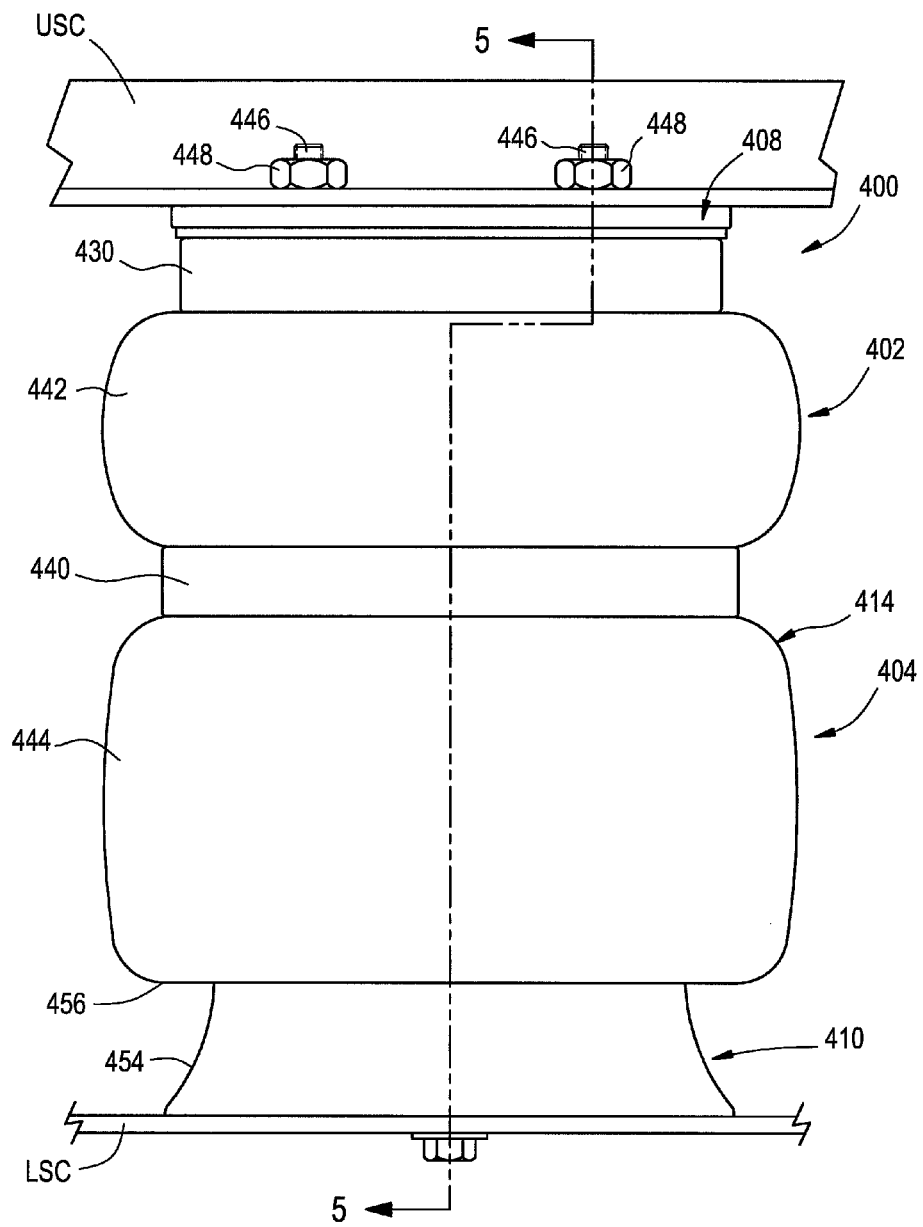
FIG. 4 is a side view of another example of a gas spring and damper assembly in accordance with the subject matter of the present disclosure.
Figure 5:
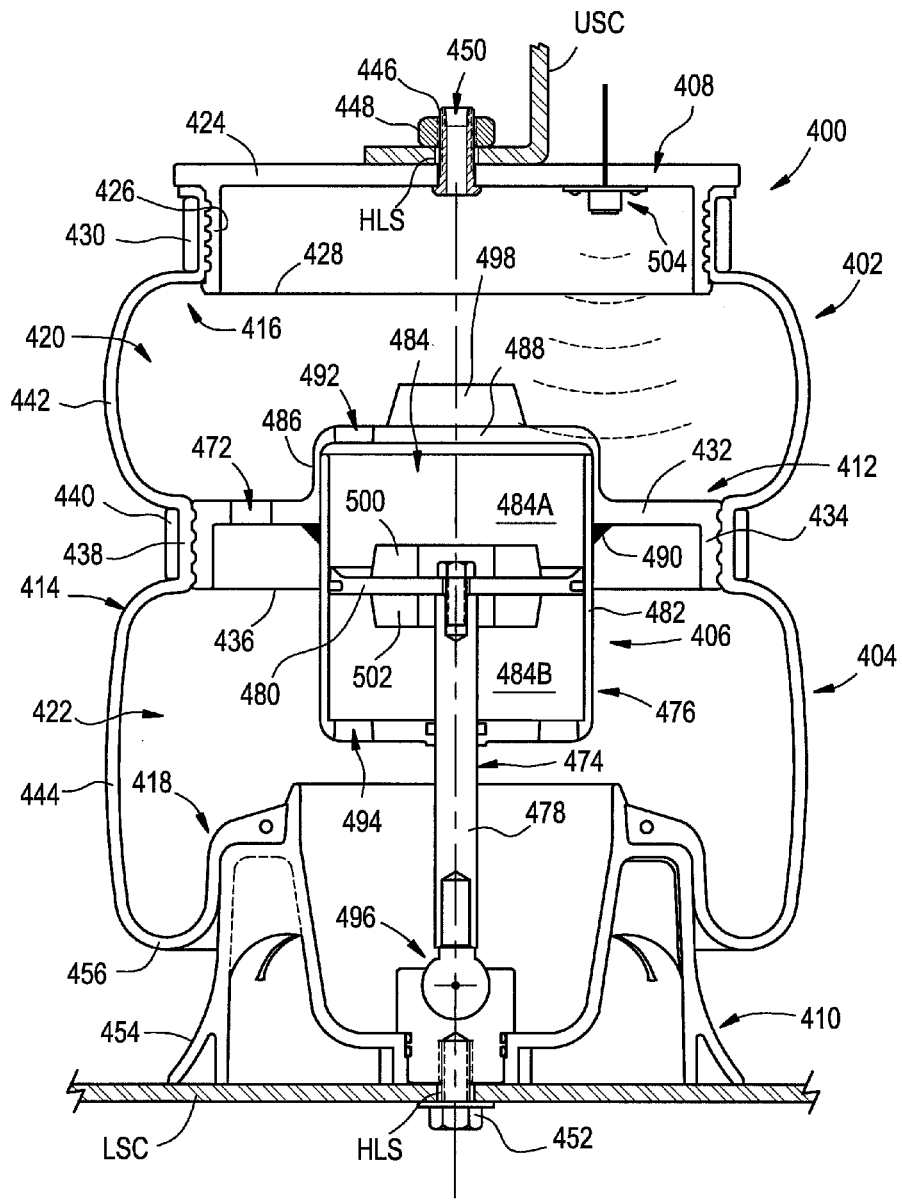
FIG. 5 is a cross-sectional side view of the gas spring and damper assembly in FIG. 4 taken from along line 5-5 therein.

Another example of a gas spring and damper assembly 400 in accordance with the subject matter of the present disclosure, such as has been described above and/or may be suitable for use as gas spring and damper assemblies 110 in FIG. 1, is shown in FIGS. 4 and 5 as having a longitudinally-extending axis AX. Assembly 400 includes a gas spring 402, a gas spring 404 and a damper 406 that is substantially-entirely disposed within gas spring 404. The arrangement shown in FIGS. 4 and 5 differs from the construction shown in FIGS. 2 and 3 in that gas springs 402 and 404 of assembly 400 include one or more common components. Whereas, gas springs 202 and 204 of assembly 200 are shown and described in connection with FIGS. 2 and 3 as being otherwise fully-assembled gas springs that are separately provided.

In the arrangement shown in FIGS. 4 and 5, gas spring and damper assembly 400 includes opposing end members end members 408 and 410 with an intermediate structure 412 disposed longitudinally therebetween. An elongated flexible wall 414, such as in the form of an elastomeric sleeve, for example, can extend longitudinally between opposing ends 416 and 418. In the arrangement shown in FIGS. 4 and 5, flexible wall 414 is operatively connected with end members 408 and 410 and with intermediate structure 412 in a substantially fluid-type manner such that spring chambers 420 and 422 are respectively defined between intermediate structure 412 and end members 408 and 410.

It will be appreciated that flexible wall 414 can be operatively connected to the end members and/or intermediate structure in any suitable manner. For example, end member 408 is shown in FIG. 5 as including an end wall 424 and a mounting wall 426 that projects longitudinally outwardly from along the end wall toward a distal edge 428. End 416 of flexible wall 414 is disposed along mounting wall 426 and a retaining ring 430 can be crimped or otherwise deformed in an inward direction to secure the end of the flexible wall in abutting engagement with mounting wall 426 in a substantially fluid-tight manner.

End member 410 is shown in FIGS. 4 and 5 as being substantially identical to end member 218, which has been shown and described above in connection with FIGS. 2 and 3. For purposes of brevity, a full and detailed description of end member 410 is not repeated here. It is to be recognized and understood, however, that the foregoing description of end member 218, including all of the features thereof, is equally applicable to end member 410. As such, it will be appreciated that end 418 of flexible wall 414 is secured along end member 410 such that a substantially fluid-tight seal is formed therebetween.

Intermediate structure 412 is shown in FIG. 5 as including a base wall 432 and a mounting wall 434 that projects longitudinally-outwardly from along base wall 432 toward a distal edge 436. Intermediate structure 412 is positioned longitudinally between end member 408 and end member 410 with an intermediate section 438 of flexible wall 414 secured along mounting wall 434 such that a substantially fluid-tight seal is formed therebetween. It will be appreciated that any suitable connection and/or securement configuration can be used. For example, a retaining ring 440 can be crimped or otherwise deformed in an inward direction to secure intermediate section 438 in abutting engagement with mounting wall 434. In this manner, a section 442 of flexible wall 414 together with end member 408 and intermediate structure 412 at least partially form gas spring 402, and a section 444 of flexible wall 414 together with end member 410 and intermediate structure 412 at least partially form gas spring 404.

Gas spring and damper assembly 400 can be disposed between associated sprung and unsprung masses of an associated vehicle in any suitable manner. For example, one end member of one gas spring can be operatively connected to the associated sprung mass with one end member of the other gas spring disposed toward and operatively connected to the associated unsprung mass. In the embodiment shown in FIGS. 4 and 5, for example, end member 408 is secured along a first or upper structural component USC, such as associated vehicle body BDY in FIG. 1, for example, and can be secured thereon in any suitable manner. For example, one or more securement devices, such as mounting studs 446, for example, can be included along end member 408. In some cases, the one or more securement devices (e.g., mounting studs 446) can project outwardly from end member 408 and can be secured thereon in a suitable manner, such as, for example, by way of a flowed-material joint (not shown) or a press-fit connection (not identified). Additionally, such one or more securement devices can extend through mounting holes HLS in upper structural component USC and receive one or more threaded nuts 448 or other securement devices, for example. As an alternative to one or more of mounting studs 446, one or more threaded passages (e.g., blind passages and/or through passages) could be used in conjunction with a corresponding number of one or more threaded fasteners.

Additionally, a fluid communication port, such as a transfer passage 450, for example, can optionally be provided to permit fluid communication with one or more of spring chambers 420 and/or 422, such as may be used for transferring pressurized gas into and/or out of one or more of the spring chambers, for example. In the exemplary embodiment shown, transfer passage 450 extends through at least one of mounting studs 446 and is in fluid communication with spring chamber 420. It will be appreciated, however, that any other suitable fluid communication arrangement could alternately be used.

End member 410 can be secured along a second or lower structural component LSC, such as an axle AXL in FIG. 1, for example, in any suitable manner. As one example, lower structural component LSC could include one or more mounting holes HLS extending therethrough. In such case, a threaded fastener 452 could extend through one of mounting holes HLS and threadably engage end member 410 or a component thereof to secure the end member on or along the lower structural component, such as has been described above in detail, for example. Additionally, it will be recognized that end member 410 is shown as being of a type commonly referred to as a piston (or a roll-off piston) that has an outer surface 454 that abuttingly engages flexible wall 414 such that a rolling lobe 456 is formed therealong. As gas spring and damper assembly 400 is displaced between extended and collapsed conditions, rolling lobe 456 is displaced along outer surface 454 in a conventional manner.

As indicated above, gas springs 402 and 404 preferably have different spring rates such that one of the gas springs deflects at a different rate than the other gas spring. In the arrangement shown in FIGS. 4 and 5, gas spring 402 is a convoluted bellows-type gas spring that has a greater spring rate than gas spring 404, which is of a rolling lobe-type construction. In a preferred arrangement, gas springs 402 and 404 are sized and configured relative to one another such that the spring rate of gas spring 402 is at least approximately two (2) times the spring rate of gas spring 404. In a more preferred arrangement, the spring rate of gas spring 402 can be within a range of from approximately four (4) times to approximately ten (10) times the spring rate of gas spring 404.

Flexible wall 414 can be formed in any suitable manner, such as by using one or more fabric-reinforced, elastomeric plies or layers (not shown) and/or one or more un-reinforced, elastomeric plies or layers (not shown), for example. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Figure 6:
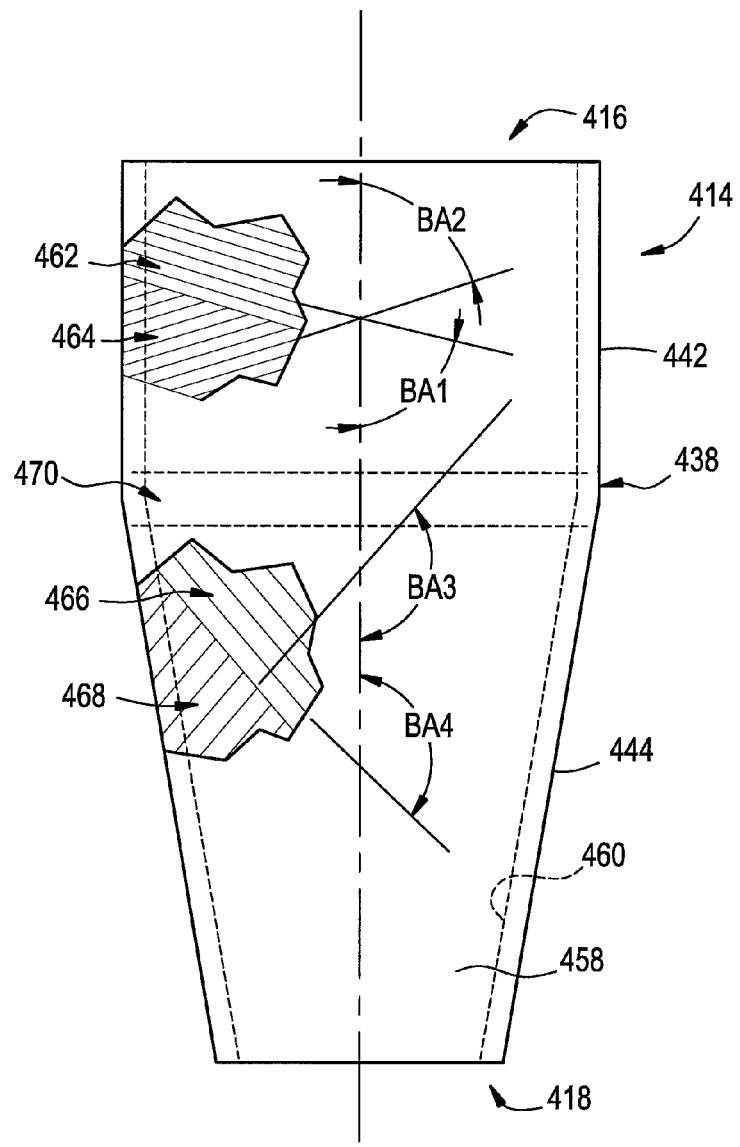
FIG. 6 is a side elevation view, in partial cross section, of one example of a flexible sleeve suitable for use in the gas spring and damper assembly in FIGS. 4 and 5.

As identified in FIG. 6, flexible wall 414 can include an outer or cover ply 458, an inner or liner ply 460, and at least two reinforcing plies. The at least two reinforcing plies can be of any suitable construction and/or configuration. For example, the reinforcing plies can include one or more lengths of filament material that are at least partially embedded therein. It will be appreciated that the one or more lengths of filament material can be of any suitable type, kind and/or construction, such as monofilament polymeric strands, braided cotton yarn or bundled carbon fibers, for example. Furthermore, such one or more lengths of filament material could optionally be coated or otherwise treated, such as, for example, to improve adhesion with the adjacent plies or other surrounding material. For example, the filament material could be rubber coated, such that upon applying a layer of rubber over the filament material improved adhesion between the various layers could result during and/or after vulcanization, for example.

Additionally, it will be appreciated that the one or more lengths of filament material, if provided, can be oriented in any suitable manner, such as, for example, by having the filaments of one reinforcing ply 462 disposed at one bias angle and the filaments of another reinforcing ply 464 disposed at approximately the same bias angle but oriented in the opposing direction, such as is represented in FIG. 6 by reference dimensions BA1 and BA2. In some cases, the flexible wall can include two reinforcing plies with equally angled but oppositely oriented reinforcing filaments that extend longitudinally along the full length of the flexible wall. In such case, the differing spring rates of the two gas springs can be provided by altering other features and/or characteristics of the two gas springs, such as spring volume and/or spring construction (e.g., rolling lobe-type versus convoluted bellows-type spring constructions).

In other cases, the flexible wall can include two reinforcing plies with equally angled but oppositely oriented reinforcing filaments that extend lengthwise along a first portion or section of the flexible wall. In such case, the flexible wall can include two additional reinforcing plies with equally angled but oppositely oriented reinforcing filaments that extend lengthwise along a second portion or section of the flexible wall. In a preferred arrangement, the additional reinforcing plies are disposed at a bias angle that is different from the bias angle of the reinforcing filaments of the reinforcing plies in the first section of the flexible wall.

As illustrated in FIG. 6, for example, section 442 of flexible wall 414 is shown as including reinforcing plies 462 and 464. Additionally, section 444 of flexible wall 414 is shown as including reinforcing plies 466 and 468, which include one or more lengths of filament material. Reinforcing ply 466 includes filaments disposed at one bias angle, and reinforcing ply 468 includes filaments disposed at approximately the same bias angle but oriented in the opposing direction, such as is represented in FIG. 6 by reference dimensions BA3 and BA4. It will be appreciated that bias angles BA1 and BA2 differ from bias angles BA3 and BA4. As a result, sections 442 and 444 of flexible wall 414 will have different properties and performance characteristics, which can contribute to the formation of gas springs 402 and 404 with different spring rates. In some cases, a transition zone 470 between sections 442 and 444 can be included. In some cases, transition zone 470 can be formed along intermediate section 438 such that the transition zone is disposed along the mounting wall 434 of intermediate structure 412 in an assembled condition.

In some cases, one or more openings 472 can extend through base wall 432 of intermediate structure 412 to permit fluid communication and pressurized gas transfer between spring chambers 420 and 422. In some cases, such pressurized gas transfer between the spring chambers can be used to generate pressurized gas damping, such as has been described above in detail. In addition to the pressurized gas damping that may be generated as a result of the different spring rates of gas springs 402 and 404, gas spring and damper assembly 400 can also include damper 406, which can be secured in operative association with gas spring 402 and/or 404 in any suitable manner. Additionally, as indicated above, damper 406 can be of any suitable construction and/or configuration, and can provide damping using any suitable principles of operation. As one example, the damper could take the form of an otherwise conventional hydraulic damper. As another example, damper 406 can take the form of a pressurized gas damper that utilizes pressurized gas as the operating medium, such as has been described above in detail in connection with damper 206 in FIG. 3.

It will be appreciated that damper 406 is shown in FIG. 5 as being substantially identical to damper 206, which has been shown and described above in connection with FIG. 3. For purposes of brevity, a full and detailed description of damper 406 is not repeated here. It is to be recognized and understood, however, that the foregoing description of damper 206, including all of the features and connections thereof, is equally applicable to damper 406.

Damper 406 is shown in FIG. 5 as including damper elements 474 and 476 that are operatively interconnected with one another for telescopic extension and compression. Damper element 474 is shown as being operatively connected to end member 410, and extends from the end member toward intermediate structure 412. Damper element 476 is shown as being operatively connected to intermediate structure 412, and extends from the intermediate structure toward end member 410. Additionally, damper elements 474 and 476 are operatively interconnected with one another such that the damper elements can move relative to one another as gas spring and damper assembly 400 undergoes displacement between compressed and extended conditions, such as has been described above in detail.

As shown in FIG. 5, damper element 474 includes a damper rod 478 and a damper piston 480. Damper element 476 includes a side wall 482 that at least partially defines a damping chamber 484. In some cases, base wall 432 of intermediate structure 412 can include an attachment wall portion 486 that extends from along the base wall in an axial direction toward end member 408 and an end wall portion 488 that extends across attachment wall portion 486 in an orientation generally transverse to axis AX. The attachment wall portion and the end wall portion can at least partially define an external recess or cavity (not numbered) extending inwardly into gas spring 402 from along intermediate structure 412. In some cases, at least a portion of side wall 482 of damper element 476 can extend into the external cavity in intermediate structure 412. Damper element 476 is shown as being fixedly secured along intermediate structure 412 by way of a flowed-material joint 490 rather than by way of a threaded connection, such as is shown and described in connection with damper element 284 in FIG. 3.

As discussed above in connection with damper elements 282 and 284, damper elements 474 and 476 are operatively interengaged with one another for telescopic extension and compression. One or more fluid communication ports can be selectively provided in one or more of damper piston 480, side wall 482, the end wall of damper element 476 and/or end wall portion 488 of intermediate structure 412. In the arrangement shown in FIG. 5, for example, a communication port 492 extends through end wall portion 488 such that a chamber portion 484A and spring chamber 420 are in fluid communication with one another. Additionally, a communication port 494 extends through the end wall of damper element 476 such that a chamber portion 484B and spring chamber 422 are in fluid communication with one another. It will be appreciated that such fluid communication ports, if provided, can be sized and configured to generate damping forces during relative movement between damper element 474 and damper element 476. In some cases, one or more valves and/or throttle elements could be included in fluid communication on or along the one or more fluid communication ports.

In some cases, the end of damper element 474 can be operatively connected with end member 410 by way of a high-articulation misalignment mount 496 that is capable of freely compliant (e.g., non-resilient) articulation. In this manner, the end of damper element 476 can be fixedly attached to the intermediate structure of gas spring and damper assembly 400, such as has been described above, for example. Additionally, gas spring and damper assembly 400 can, optionally, include one or more additional features, devices and/or components, such as bumpers 498, 500 and 502. It will be appreciated that bumpers 498, 500 and 502 respectively correspond to bumpers 328, 330 and 332, as have been discussed above in detail in connection with gas spring and damper assembly 200. Furthermore, gas spring and damper assembly 400 can, optionally, include a height or distance sensing device 504, such as has been described above in detail as sensing device 336 in connection with gas spring and damper assembly 200, for example.

One example of a method 600 of assembling a gas spring and damper assembly in accordance with the subject matter of the present disclosure, such as assemblies 110, 200 and/or 400, for example, is shown in FIG. 7 as including providing a damper, such as damper 116, 206 and/or 406, for example, as is represented by item number 602. Method 600 can also include at least partially assembling a first gas spring (e.g., gas spring 112, 114, 202, 204, 402 and/or 404) having an associated first gas spring rate, such as is represented in FIG. 7 by item number 604. Method 600 can further include installing the damper within the first gas spring, such as is represented in FIG. 7 by item number 606.

Method 600 can further include at least partially assembling a second gas spring (e.g., gas spring 112, 114, 202, 204, 402 and/or 404) having an associated second gas spring rate that differs from the first gas spring rate, such as is represented in FIG. 7 by item number 608. Method 600 can also include connecting the first and second gas springs in fluid communication with one another, such as is represented in FIG. 7 by item number 610. Method 600 can further include securing the first and second gas springs in series with one another, such as is represented in FIG. 7 by item number 612.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring and damper assembly comprising:
   a first end member;
   a second end member disposed in spaced relation to said first end member such that a longitudinal axis extends therebetween;
   an intermediate structure interposed between said first and second end members;
   a first flexible wall portion operatively connected between said first end member and said intermediate structure, said first flexible wall portion extending peripherally about said axis and at least partially defining a first gas spring having a first spring chamber and a first spring rate;
   a second flexible wall portion operatively connected between said second end member and said intermediate structure, said second flexible wall portion extending peripherally about said axis and at least partially defining a second gas spring having a second spring chamber and a second spring rate that is at least two times greater than said first spring rate; and,
   a damper operative to dissipate kinetic energy acting on said assembly, said damper at least partially disposed within at least one of said first and second spring chambers and operatively connected to said intermediate structure and said first end member.

2. A gas spring and damper assembly according to claim 1, wherein said damper is secured between said first end member and said intermediate structure and is substantially-entirely external to said second spring chamber.

3. A gas spring and damper assembly according to claim 2, wherein said damper is disposed substantially-entirely within said first spring chamber.

4. A gas spring and damper assembly according to claim 1, wherein said intermediate structure includes at least one pressurized-gas transfer passage extending therethrough, said at least one passage operative to permit pressurized gas flow between said first and second spring chambers and thereby generate pressurized gas damping.

5. A gas spring and damper assembly according to claim 4, wherein said damper is configured to dissipate energy acting on said assembly from vibrations within a first predetermined range of frequencies, and said pressurized gas damping through said at least one passage of said intermediate structure is operative to dissipate energy acting on said assembly from vibrations within a second predetermined range of frequencies that is different from said first predetermined range of frequencies.

6. A gas spring and damper assembly according to claim 1, wherein said damper is one of a hydraulic damper, a pressurized-gas damper, an electromagnetic damper and an electrorheologic damper.

7. A gas spring and damper assembly according to claim 6, wherein said damper includes first and second damping elements operatively engaged with one another for reciprocal movement relative to one another, said first damping element including a housing wall at least partially defining a damping chamber, said second damping element including a damper rod extending lengthwise between opposing first and second ends and a damper piston disposed along said first end of said damper rod with said damper piston and a portion of said damper rod disposed within said damping chamber.

8. A gas spring and damper assembly according to claim 7, wherein said damper is a pressurized-gas damper and said damper piston separates said damping chamber into a first damping chamber portion and a second damping chamber portion.

9. A gas spring and damper assembly according to claim 8, wherein at least one of said first and second damping chamber portions is disposed in fluid communication with at least one of said first and second spring chambers.

10. A gas spring and damper assembly according to claim 9, wherein said first and second damping chamber portions are substantially fluidically isolated from one another by said damper piston, said first damping chamber portion is disposed in fluid communication with said first spring chamber and said second damping chamber portion is disposed in fluid communication with said second spring chamber.

11. A gas spring and damper assembly according to claim 1 further comprising a first flexible wall and a second flexible wall, said first flexible wall extending between opposing ends and including said first flexible wall portion, and said second flexible wall extending between opposing ends and including said second flexible wall portion.

12. A gas spring and damper assembly according to claim 11 further comprising a third end member and a fourth end member, said the third end member disposed in spaced relation to said first end member and secured to an end of said first flexible wall opposite said first end member to at least partially define said first gas spring, said fourth end member disposed in spaced relation to said second end member and secured to an end of said second flexible wall opposite said second end member to at least partially defined said second gas spring.

13. A gas spring and damper assembly according to claim 12, wherein said third and fourth end members are secured to one another to at least partially form said intermediate structure.

14. A gas spring and damper assembly according to claim 12, wherein a substantially fluid-tight seal is formed between said third and fourth end members.

15. A gas spring and damper assembly according to claim 11, wherein said first flexible wall has an elongated sleeve-type construction that forms a rolling lobe along said first end member, and said second flexible wall has a convoluted bellows-type construction, said first and second flexible walls disposed in series with one another.

16. A gas spring and damper assembly according to claim 1, wherein said first and second flexible wall portions are sections of a common flexible wall, said flexible wall including an inner layer of elastomeric material, an outer layer of elastomeric material, a first plurality of reinforcing plies disposed along said first flexible wall portion and a second plurality of reinforcing plies disposed along said second flexible wall portion.

17. A gas spring and damper assembly according to claim 16, wherein said first plurality of reinforcing plies are disposed at a first bias angle relative to said longitudinal axis and oriented in opposing directions relative to one another, and said second plurality of reinforcing plies are disposed at a second bias angle relative to said longitudinal axis that is different from said first bias angle with said second plurality of reinforcing plies being oriented in opposing directions relative to one another.

18. A method of assembling a gas spring and damper assembly, said method comprising:
   providing a first end member, a second end member and an intermediate structure;
   positioning said first end member and said second end member in spaced relation to one another with said intermediate structure interposed between said first and second end members;
   securing a first flexible wall portion between said first end member and said intermediate structure to at least partially define a first gas spring having a first spring chamber and a first spring rate;
   securing a second flexible wall portion between said second end member and said intermediate structure to at least partially define a second gas spring having a second spring chamber and a second spring rate that is at least two times greater than said first spring rate;
   providing a damper operative to dissipate kinetic energy acting on said assembly, positioning at least a portion of said damper within at least one of said first and second spring chambers; and,
   connecting said damper to said intermediate structure and said first end member.

19. A gas spring and damper assembly comprising:
   a first end member with an outer side wall;
   a second end member disposed in spaced relation to said first end member such that a longitudinal axis extends therebetween;
   an intermediate structure interposed between said first and second end members;
   a first flexible wall portion operatively connected between said first end member and said intermediate structure, said first flexible wall portion extending peripherally about said axis and at least partially defining a first gas spring having a first spring chamber and a first spring rate;
   a second flexible wall portion operatively connected between said second end member and said intermediate structure, said second flexible wall portion extending peripherally about said axis and at least partially defining a second gas spring having a second spring chamber and a second spring rate that is at least two times greater than said first spring rate, said first flexible wall portion forming a rolling lobe along said outer side wall of said first end member; and,
   a pressurized gas damper operative to dissipate kinetic energy acting on said assembly, said damper at least partially disposed within at least said first spring chamber and operatively connected between said first end member and said intermediate structure, said damper including:
      a housing wall at least partially defining a damping chamber;
      a damper rod extending lengthwise between opposing first and second ends, said first end operatively connected to said first end member and said second end disposed within said damping chamber for reciprocal movement relative to one another; and,
      a damper piston disposed along said second end of said damper rod such that said damper piston and a portion of said damper rod are disposed within said damping chamber, said damper piston separating said damping chamber into a first damping chamber portion and a second damping chamber portion.

20. A gas spring and damper assembly according to claim 19, wherein said first and second damping chamber portions are substantially fluidically isolates said first and second damping chamber portions from one another, and with each of said first damping chamber portion disposed in fluid communication with said first spring chamber and said second damping chamber portion disposed in fluid communication with said second spring chamber.

* * * * *